3,326,723
FUEL CELL ELECTRODE CONSTRUCTION
Robert E. Gorton, Bolton, Conn., assignor to Leesona Corporation, Cranston, R.I., a corporation of Massachusetts
Filed Jan. 4, 1963, Ser. No. 249,475
4 Claims. (Cl. 136—86)

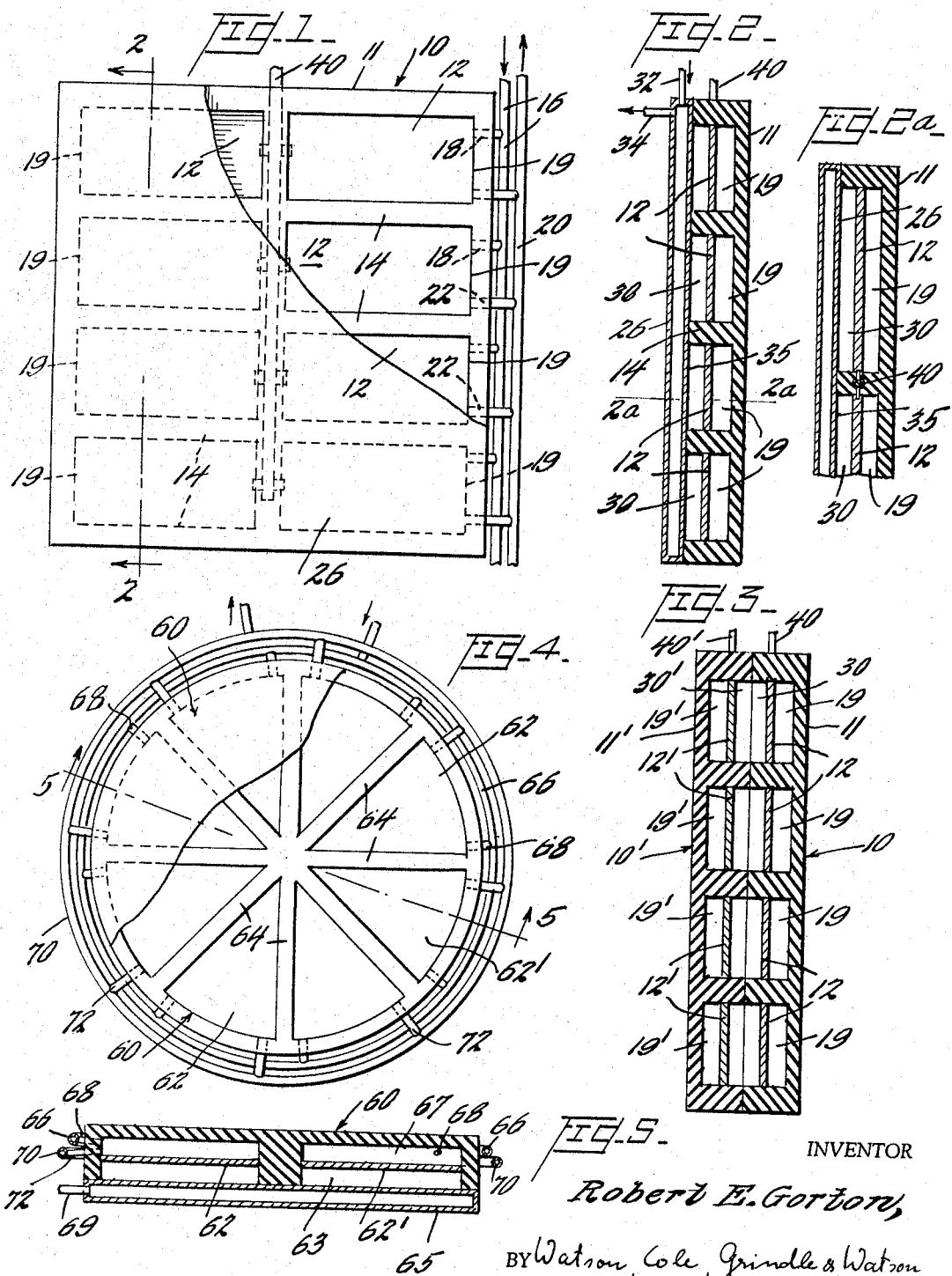

This invention relates to fuel cells and more particularly, to an improved fuel cell electrode construction.

In constructing fuel cells to provide a sufficient voltage output, it is often the practice to connect many fuel cell electrode pairs in series. This is because the normal potential of a pair of electrodes is relatively low and the equipment which is required to be driven by a fuel cell requires a potential which is much higher than the normal output potential of the individual electrode pairs. It is also well known in the art to stack a large number of electrodes in one housing so that electrolyte may be supplied to the interior of the housing to provide for chemical reaction between all of the electrode pairs. This assembly of stacked electrodes is usually serially connected with respect to electrical conduction.

One of the problems of this type of structure, however, is the reduction of output current which results from the failure of any one pair and in fact, any one electrode in the assembly, because the electrodes are all serially connected and the output current must flow through each of the electrodes. Therefore, any failure of a single electrode results in an increased internal resistance through which the entire output current must flow. In other words, in case of a malfunction of a single electrode, the output of the entire serially connected fuel cell is greatly reduced. The cause of this electrode failure might be a local defect in the surface of one of the electrodes which would affect only a small segment of the whole electrode area.

Accordingly, it is an object of this invention to obviate the above disadvantages.

It is another object of this invention to provide an improved fuel cell electrode structure which exhibits relatively constant output characteristics even when one of the electrodes developes a defect.

Briefly, in accordance with aspects of this invention, I employ an improved electrode construction in which a number of electrodes are mounted in a single plane, each of the electrodes being electrochemically separated from the other electrodes in the plane. In this arrangement, I supply respective gases to the electrodes from common sources and place these electrodes in cooperating relationship in a tank to employ a common electrolyte while confining the electrolytic action between individual pairs of electrodes.

Advantageously, with such an arrangement the resulting cell system constitutes a number of individual cells electrically connected in parallel, which cells are then serially connected to produce the required output voltage. In accordance with one illustrative embodiment of this invention, I employ generally rectangular shaped electrodes mounted to support a plurality of spaced electrodes in a common plane.

Advantageously, these electrodes are separated by insulating dividers and gases are fed to the electrodes from a common source. A pair of these electrode supporting members are then mounted in face-to-face relationship such that the electrolysis of each cell is confined to the area between the two elemental face-to-face electrodes. Should one of the elemental pairs of electrodes fail, the result is an increased resistance between the electrodes of these practical elemental pairs. Such a malfunction, however, does not inhibit the proper operation of the remaining elemental pairs and therefore, does not reduce the output potential, and only slightly reduces the output current of the fuel cell assembly.

These and various other objects and features of the invention will be more clearly understood from a reading of the detailed description of the invention in conjunction with the drawing in which:

FIG. 1 is a view in elevation, partially in section, of one illustrative embodiment of this invention;

FIG. 2 is a view in section taken along the line 2—2 of FIG. 1;

FIG. 2a is a view in section taken along the line 2a—2a of FIG. 2;

FIG. 3 is a view in section employing a pair of electrode assemblies of the type of the right hand electrode shown in FIG. 2;

FIG. 4 is a view in elevation of another illustrative embodiment of this invention; and, FIG. 5 is a view in section taken along the line 5—5 of the embodiment of FIG. 4.

Referring now to FIG. 1, there is depicted an electrode assembly 10 including a mount 11 and a plurality of electrodes 12 mounted in a common plane in the mount 11. Advantageously, the mount 11 is of insulating material and extends or protrudes beyond the plane of the electrodes 12 to define a divider between the electrodes, which divider confines the electrolysis to unitized areas between the respective electrode pairs, as will be subsequently described.

Also advantageously, the unitized electrode assembly is provided with an intake gas pipe 16 which is connected by communicating passages 18 to each of the gas chambers 19 adjacent the electrodes 12 and a suitable outlet pipe 20 is provided which is connected by communicating tubes 22 to the gas compartment or chamber adjacent each of the electrodes 12. This unitized electrode assembly may be employed in combination with a flat electrode 26, shown partly cut away in FIG. 1 and in section in FIG. 2. When electrode assemblies 10 and 26 are placed in abutting relationship, the insulating dividers 14 contact the electrode 26 to define a plurality of compartments 30 into which electrolyte is introduced through suitable conduit means, not shown. A suitable gas is introduced to the electrode 26 by means of gas ports, such as port 32. Similarly, an exhaust port 34 may be employed with electrode 26 to remove the exhausted gas and water vapor or other by-products of the electrolysis.

With this novel arrangement it will be understood that the electrolysis at the interface of one of the electrodes 12 is restricted to the limited area such as area 35 on the electrode 26. Should this electrode 12 malfunction, causing the surface in contact with the electrolyte to exhibit a high electrical resistance, the output potential of the entire assembly will be only slightly affected because the remaining cells will continue to function in the normal manner and thus, this malfunction will not disable the entire device. It is also possible to employ pairs of electrode assemblies 10 positioned to face each other, as best seen in FIG. 3 in which the respective dividers are in contact with each other and each of the electrode assemblies is composed of a plurality of electrochemically separated electrode areas facing each other. One assembly is designated by prime numbers and is similar to the other assembly. The facing electrode chambers 30 and 30' cooperate to define an enlarged chamber between respective electrode pairs 12 and 12'. With this novel arrangement, all of the elemental electrode areas of one polarity are supplied from a common gas source and all of the electrodes of the other polarity are supplied by gas from a second source. For example, these gases might be hydrogen and oxygen, respectively. Further, the electrolyte for all of the segmented cells might be provided from a single source. This electrolyte may, for example, be potassium hydroxide, preferably at an elevated temperature, such as of the order of 400-450° F.

Because of the mounting of the electrodes in a common plane on a mount 11, it is a simple matter to connect the respective area electrodes 12 by means of a conductor, such as conductor 40, to a suitable output terminal post (not shown). Thus, if the terminal post of all the electrodes of one polarity of one unitized assembly were connected to a common terminal, and a similar arrangement were employed for the electrodes of the other polarity, such as 26, then the embodiment of FIG. 2 would be effectively connected in a parallel relationship. Similarly, in the embodiment of FIG. 3, all of the terminals 40 for the unitized assembly of one polarity would be connected to one output terminal while the terminals of the other electrode assemblies would be connected to the other output terminal.

Referring now to FIGS. 4 and 5, there is disclosed a preferred embodiment of this invention in which a circular electrode assembly 60 is comprised of a plurality of segmented electrodes 62 separated from each other by an insulating divider 64. Advantageously, this divider 64 extends beyond the common plane containing electrodes 62 to restrict the electrolysis of the individual electrodes to the chamber 63 between one electrode, such as 62' and the surface of its cooperating electrode 65 of opposite polarity, as shown in FIG. 5. With this novel arrangement of electrodes, one of the gases may be supplied to the chamber 67 defined between the electrode and the supporting gas chamber in a manner shown to include pipes which extend around the periphery of the electrode, such as pipe 66. This pipe is connected by a communicating passage, such as passage 68, to each of the gas chambers. The assembly is also provided with an exhaust conduit 70 which communicates by means of a plurality of communicating passages 72 with each of the individual gas chambers, as best seen in FIG. 5. Electrolyte is supplied to and removed from each chamber 63 by suitable pipes (not shown) and all of the electrodes 62 are connected by one conductor (not shown) while electrode 65 is connected to another conductor (also not shown). The other gas is supplied to and removed from the interior of electrode 65 by means of conduits, such as 69.

Accordingly, with this novel construction a number of unitized electrode areas are electrically connected in parallel, gases are supplied to and exhausted from individual gas chambers associated with the respective electrodes, while the electrolysis of each electrode pair is confined to a predetermined region such that the malfunction of one of the electrode pairs will not affect the output potential of the fuel cell. In other words, if a fault occurs in any of the unitized electrodes, such as electrode 62', only that particular electrode will cease to generate. The remainder of the unitized electrodes continue to operate with an increase in current density and the other electrodes therefore carry the full load of the assembly with only a slight increase in the internal resistance.

While I have shown and described two illustrative embodiments of this invention, it is understood that the concepts thereof may be employed in other embodiments without departing from the spirit and scope of this invention.

What is claimed is:

1. In a fuel cell the combination comprising a mount, a plurality of first electrodes having a common polarity and connected in parallel relationship mounted on said mount substantially in a common plane, said mount extending beyond said common plane to define a separator between each of said first electrodes, means including said mount and said first electrodes for defining a plurality of gas chambers adjacent one surface of said first electrodes, a second electrode assembly in contact with said separator to define an electrolyte compartment with said other surface of said first electrodes, means for supplying a gas to each of said chambers and means for removing said gas from each of said chambers.

2. A pair of unitized fuel cell assemblies including a first and a second electrode mount each having a plurality of electrodes having a common polarity and connected in parallel relationship mounted in a common plane thereon, each of said mounts having dividers which extend beyond the respective common plane to contact the dividers of the other mount, said dividers defining a plurality of electrolytic chambers, means for supplying electrolyte to said electrolytic chambers, means including said mounts and electrodes for forming gas chambers adjacent each of said electrode mounts at the surface opposite of said electrolyte chambers, and means for supplying gases to the respective electrodes, said electrolytic action being confined to unitized regions between respective incremental areas of said electrodes.

3. A combination according to claim 2, wherein said electrode assemblies are rectangular.

4. The combination according to claim 2, wherein said mounts are circular and wherein said means for supplying gas to said electrodes includes means for supplying gas to the periphery of each of said electrodes.

No references cited.

WINSTON A. DOUGLAS, *Primary Examiner.*

H. FEELEY, *Assistant Examiner.*